US009816635B2

(12) United States Patent
Jaeckle (10) Patent No.: US 9,816,635 B2
(45) Date of Patent: Nov. 14, 2017

(54) VALVE HAVING AN EXCHANGEABLE CARTRIDGE

(71) Applicant: Georg Fischer Rohrleitungssysteme AG, Schaffhausen (CH)

(72) Inventor: Timo Jaeckle, Tengen (DE)

(73) Assignee: Georg Fischer Rohrleitungssysteme AG (CH)

( * ) Notice: Subject to any disclaimer, the term of this patent is extended or adjusted under 35 U.S.C. 154(b) by 0 days.

(21) Appl. No.: 14/904,541

(22) PCT Filed: Aug. 5, 2014

(86) PCT No.: PCT/EP2014/066779
§ 371 (c)(1),
(2) Date: Jan. 12, 2016

(87) PCT Pub. No.: WO2015/028262
PCT Pub. Date: Mar. 5, 2015

(65) Prior Publication Data
US 2016/0161012 A1    Jun. 9, 2016

(30) Foreign Application Priority Data

Aug. 27, 2013  (EP) ..................................... 13004212
Jun. 3, 2014   (EP) ..................................... 14170931

(51) Int. Cl.
*F16K 1/30*     (2006.01)
*F16K 27/02*    (2006.01)
(Continued)

(52) U.S. Cl.
CPC .............. *F16K 27/02* (2013.01); *F16K 1/308* (2013.01); *F16K 17/04* (2013.01); *G05D 16/0655* (2013.01); *Y10T 137/6011* (2015.04)

(58) Field of Classification Search
CPC ......... Y10T 137/5109; Y10T 137/7504; Y10T 137/7613; Y10T 137/7668;
(Continued)

(56) References Cited

U.S. PATENT DOCUMENTS 3,392,749 A  *  7/1968  Gneiding ........... G05D 16/0655
                                                137/484.6
3,561,468 A     2/1971  Sugden, Jr.
(Continued)

FOREIGN PATENT DOCUMENTS

DE      1951869 A1    4/1970
DE      4434634 C2   12/1999
(Continued)

OTHER PUBLICATIONS

International Search Report (in English and German) and Written Opinion of the International Searching Authority (in German) for PCT/EP2014/066779, dated Nov. 17, 2014; ISA/EP.

*Primary Examiner* — Matthew W Jellett
(74) *Attorney, Agent, or Firm* — Harness, Dickey & Pierce, P.L.C.

(57) ABSTRACT

Valve for fluid and gaseous media, more particularly for regulating the pressure in pipelines, containing a housing of at least one upper and lower part, a pressure adjustment unit, wherein the pressure adjustment unit comprises a spindle, a spring plate, a spring holder and at least one spring, a cartridge, wherein the cartridge forms a function unit by means of which the function of the valve is defined, wherein the cartridge preferably contains an interior housing, a fastening means, a poppet and a diaphragm, wherein the diaphragm serves for dividing the housing into a medium-free and a medium-flowing area, wherein the cartridge is pre-fitted as a function unit and is disposed replaceably as a complete unit in the housing.

6 Claims, 5 Drawing Sheets

(51) Int. Cl.
*G05D 16/06* (2006.01)
*F16K 17/04* (2006.01)

(58) Field of Classification Search
CPC ......... Y10T 137/5994; Y10T 137/7793; Y10T 137/782; Y10T 137/6011; Y10T 137/7825; F16K 1/308; G05D 16/0655
USPC ........................................................ 251/61.2
See application file for complete search history.

(56) References Cited

U.S. PATENT DOCUMENTS

| | | | | |
|---|---|---|---|---|
| 4,055,198 A | * | 10/1977 | Iannelli | G05D 16/0666 137/116.5 |
| 4,760,862 A | * | 8/1988 | Mutou | G05D 16/0655 137/315.05 |
| 4,977,922 A | * | 12/1990 | McWilliams | B60C 23/001 137/269 |
| 4,986,299 A | | 1/1991 | Schultz | |
| 5,056,550 A | | 10/1991 | Mooney | |
| 5,419,365 A | | 5/1995 | Jezek | |
| 5,829,477 A | * | 11/1998 | Graham | G05D 16/0663 137/454.2 |
| 5,924,447 A | * | 7/1999 | Evans | C23C 16/4401 137/269 |
| 6,722,388 B1 | | 4/2004 | McAden | |
| 8,322,359 B2 | * | 12/2012 | Zecchi | G05D 16/0647 137/15.18 |
| 8,327,871 B1 | * | 12/2012 | Franklin | G05D 16/0605 137/271 |
| 8,534,315 B2 | * | 9/2013 | Mason | G05D 16/0672 137/315.05 |
| 9,097,360 B2 | * | 8/2015 | Mesner | F25B 41/06 |
| 9,098,092 B2 | * | 8/2015 | Clifford | G05D 16/0666 |
| 9,529,368 B2 | * | 12/2016 | Jackle | G05D 16/0655 |
| 2011/0000553 A1 | * | 1/2011 | Clifford | G05D 16/0666 137/15.18 |
| 2012/0241658 A1 | | 9/2012 | Clifford | |

FOREIGN PATENT DOCUMENTS

| | | |
|---|---|---|
| EP | 0759132 B1 | 8/1998 |
| WO | WO-2011002559 A2 | 1/2011 |

\* cited by examiner

VALVE HAVING AN EXCHANGEABLE CARTRIDGE

CROSS-REFERENCE TO RELATED APPLICATION

This application is a 371 U.S. National Stage of International Application No. PCT/EP2014/066779, filed Aug. 5, 2014, which claims priority to European Patent Application No. 14170931.1, filed Jun. 3, 2014 and European Patent Application No. 13004212.0, filed Aug. 27, 2013. The entire disclosures of the above applications are incorporated herein by reference.

The invention relates to a valve for fluid and gaseous media, more particularly for regulating the pressure in pipelines, containing a housing of at least one upper and lower part, a pressure adjustment unit, wherein the pressure adjustment unit comprises a spindle, a spring plate, a spring holder and at least one spring, a cartridge, wherein the cartridge forms a function unit by means of which the function of the valve is defined, wherein the cartridge preferably contains an interior housing, a fastening means, a poppet and a diaphragm, wherein the diaphragm serves for dividing the housing into a medium-free and a medium-flowing area.

Valves of this kind are used mainly in the domestic and industrial water supply, but they are also to be found however in other useful fields and with other media. Such valves are mostly used with the functions and operations of a pressure-reducing or pressure-retaining valve.

Pressure-reducing valves serve to reduce the higher pressure in the primary-side distribution network to an optimum pressure for the secondary-side outflow line, whereby the valve fittings and consumers in the outflow line are protected against pressures which are too high, and the service life of the valve fittings on the output side can be increased. The noise level can moreover be reduced by the installation of a pressure-reducing valve in the outflow line, and the medium consumption can also be reduced, particularly in the case of water supply networks.

The pressure-retaining valve on the other hand influences the pressure in front of the valve in order to keep the pressure constant there. Pressure-retaining valves are mostly used to ensure in the outflow area of the pumps, more particularly metering pumps, the necessary counterpressure for the reliable operation of the pump. A counterpressure valve is thereby as a rule not a constituent part of the pump but is located at some other suitable place in the delivery direction of the medium to be delivered behind the pump. The pressure-retaining valve is likewise to be used to protect systems against pressures which are too high. As soon as the pre-set pressure is exceeded at the inlet of the valve, the valve is opened and the pressure which is too high in the pipelines in front of the valve can again be reduced.

DE 44 34 634 C2 discloses a pressure-reducing valve with which the adjustment of the desired output pressure can be easily managed. The medium which is flowing into the housing has a high, or too high, pressure for further use. The desired output pressure can be adjusted by the adjustment unit by suitably pretensioning the spring. This in turn produces the corresponding force on the poppet which regulates the output pressure. If the spring is compressed too strongly then it generates a high counter-force on the poppet whereby the desired output pressure is high. The poppet, or the sealing seat, which is located between the valve element and the ring-shaped projection of the housing, only closes when the pressure building up in the valve or in the poppet chamber is so great that it exceeds the permissible output pressure, whereby the poppet is pressed against the spring force and the valve element closes the valve seat. The poppet and the valve element with rod consist of several individual parts, furthermore sealing elements are disposed thereon which guarantee the sealing tightness and which are likewise formed as separate parts.

EP 0 759 132 B1 discloses a pressure-retaining valve having a housing, a valve poppet arranged displaceably in the housing, wherein the valve poppet is pretensioned in the direction of the valve seat by means of a spring, wherein the poppet or its valve shaft is arranged in the guide disc and together form a ring gap which acts as the throttle point.

This type of valve as mentioned above has the drawback that during a function change of the valve, that is when by way of example a pressure-reducing valve which is initially required is to be replaced by a pressure-retaining valve, possibly since the use of the complete unit has changed, the complete valve has to be replaced. In the best case scenario the possibility does exist of separately replacing the individual parts in the interior, wherein the housing has to undergo subsequent machining so that the insides of another function type of valve can be used.

This in turn has on the one hand the drawback of being highly time-consuming and on the other hand the reversion cannot be undertaken and the function of the valve can no longer be changed back again. Furthermore in the case of valves known from the prior art these need time-intensive maintenance as a result of their numerous individual parts.

It is the object of the invention to provide a valve which is suitable or can be used at low cost for different functions and wherein the manufacturing costs are to be minimized. Furthermore the maintenance of the valve is to be quick and easy to carry out.

This is achieved according to the invention in that the cartridge is pre-mounted as a function unit and is arranged interchangeably as a complete unit in the housing.

This has the advantage that the housing is the same for each type of valve and the type and function of the valve is defined by the cartridge. This means that only one valve housing has to be manufactured corresponding to the structural sizes and in which a corresponding cartridge can be installed, whereby the manufacturing costs can be minimized. The cartridge thus determines the function of the valve. Thus a cartridge can be inserted in a valve housing which (cartridge) serves for example for reducing pressure, whereby a pressure-reducing valve is then formed. This cartridge can however also be replaced by way of example by a cartridge which serves by way of example for maintaining pressure and thus a pressure-retaining valve can be formed by way of example with the same housing and without any subsequent machining. Thus by exchanging the cartridge the function of the valve can be changed without any subsequent machining being required on the housing since the cartridges each have the same installation size and thus the housing is thereby compatible for all cartridges of the same structural size.

The cartridge is a pre-fitted structural unit and consists of diverse individual component parts according to the function for which the cartridge or the valve is intended.

A preferred embodiment consists in a cartridge having an internal housing in which a poppet is arranged. The poppet can be formed in one piece or also in several pieces, this means that a separate poppet tip can be disposed on the poppet and is likewise pre-fitted with fastening means which is preferably a screw. The multi-part design of the poppet simplifies the production and also the arrangement of the sealing surface which is disposed on the poppet or at the poppet tip. The sealing surface serves for regulating the valve or the through-flow. The sealing surface which is disposed on the poppet or on the poppet tip is mostly made from a different material and can be formed by way of example as a flat seal which is clamped between the poppet tip and the poppet, although obviously other possibilities for arranging the sealing surface can be used. The sealing surface interacts with the valve seat and thus regulates the through-flow and opens and closes the valve accordingly. The cartridge preferably also has a diaphragm which divides the valve in the preferred embodiments into a medium-flowing and a medium-free area.

Exchanging the cartridge and thus changing the function of the valve can take place without any further subsequent machining or mechanical work on the housing, and thus each cartridge can be inserted in one and the same housing of the same structural size, which as already mentioned minimizes production costs and makes the function of the valve variable.

This modular construction of the valve is advantageously used in the case of pressure-reducing and pressure-retaining valves, since these have a similar structure and enable their cartridges or the installation mass of the cartridges to be made the same in order that they can be installed in one unitary housing. The cartridge which is to be installed is thus advantageously a pressure-reducing cartridge or a pressure-retaining cartridge which are each disposed mutually interchangeably in the housing, wherein the function of the valve is defined by the arrangement of the corresponding cartridge. This type of construction of the valve also enables a later conversion of by way of example a pressure-reducing valve into by way of example a pressure-retaining valve, although obviously even more types of valves are conceivable which can be formed with corresponding cartridges.

So that a modular construction of this kind is possible the cartridge not only defines the function, but also maintains the sealing of the valve. Most seals are thus disposed in or on the cartridge. At least one seal is preferably located on an outer diameter of the interior housing of the cartridge, wherein several seals are also possible. In a preferred configuration of the cartridge a seal is located on the smaller diameter of the interior housing which seals between the cartridge and inlets of the output pipe and a further seal is located on the larger diameter of the cartridge which serves to seal between the interior housing of the cartridge and the receiving area for the interior housing of the cartridge in the housing lower part.

In a preferred configuration a sealing element is located on the poppet or in the poppet bore so that no medium can flow through the poppet bore and the sealing tightness is thereby guaranteed. A sealing element is also advantageously disposed on the interior housing and serves to ensure the sealing tightness between the cartridge and housing.

As a further sealing element, a sealing surface is disposed on the poppet or at the poppet tip and serves the function of the pressure-reducing or pressure-retaining valve and corresponds with the valve seat whereby the valve is opened or closed.

The valve seat is preferably disposed in the cartridge or on the interior housing. Through this construction the cartridge defines the function and the housing serves in the first instance to receive the cartridge as well as for the inflow and outflow of the medium and the fixing of the pressure to be pre-set via the pressure adjustment unit, but not however the function of the valve, this is defined via the cartridge. The valve seat and the sealing surface which are arranged on the poppet or on the poppet tip regulate the through-flow by opening and closing accordingly.

The cartridge is advantageously a disc. This serves for the improved stabilisation of the diaphragm. If now the medium flows in the bypass bores past the diaphragm in order to press this upwards and thereby slide the poppet in the poppet bore, the disc gives the diaphragm a certain stability whereby the poppet can be better raised up.

A further advantage of the valve according to the invention consists in the fact that the pressure adjustment unit can also remain in place even in the event of a function change of the valve if one such unit is then required.

Embodiments of the invention will now be described with reference to the drawings wherein the invention is not restricted only to the embodiment. The drawings show.

Figure 1:
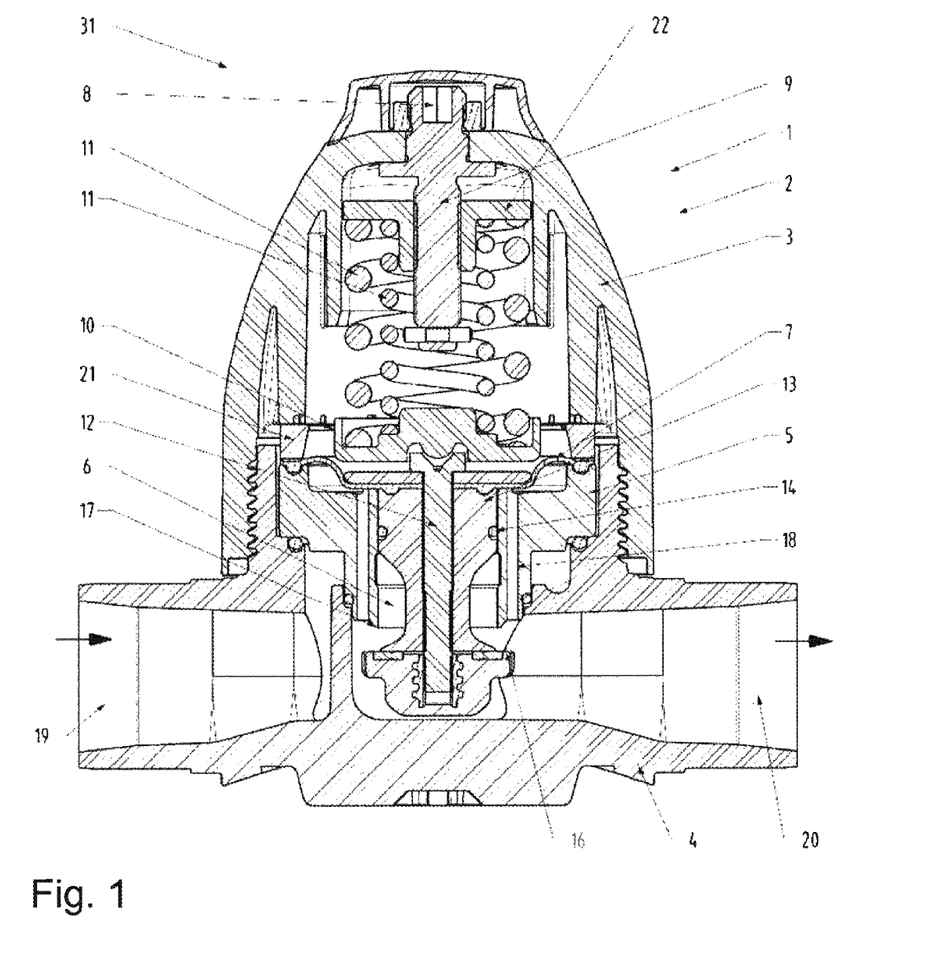
FIG. 1 a longitudinal section through a pressure-reducing valve according to the invention in the opened position, FIG. 2 a longitudinal section through a pressure-reducing valve according to the invention in the closed position, FIG. 3 a longitudinal section through a pressure-retaining valve according to the invention in the opened position, FIG. 4 a longitudinal section through a cartridge with the function of a pressure-reducing valve and FIG. 5 a longitudinal section through a cartridge with the function of a pressure-retaining valve.

FIG. 1 shows a valve 1 according to the invention in which a cartridge 30 is inserted which serves for reducing the pressure, whereby a pressure-reducing valve 31 is formed. The housing 2 is advantageously formed from an upper part 3 and a lower part 4 and remains when changing the function of the valve 1 and need not be subsequently machined in order to be able to receive a different cartridge 30, 40. A cartridge 30 is disposed in the housing 2 and has an interior housing 5. By screwing together the housing upper part 3 and the housing lower part 4 a diaphragm 7 is additionally clamped firmly between the interior housing 5 and the retaining ring 21 and is likewise disposed on the pre-fitted cartridge 30 which divides the valve 1 into a medium-free and a medium-flowing or medium-containing area. Methods of constructing a pressure-reducing valve 31 are also possible wherein the two housing parts are connected to one another by means of separate fastening means or such methods where no further spacing is required.

The interior housing 5 has through-flow openings 15 through which the medium which is flowing through the inflow pipe 19 then flows and when the valve position is open flows further through the lower region of the poppet bore 6 past the valve seat 17 towards the outlet pipe 20. The poppet 6, which is also disposed in the pre-fitted cartridge 30, is pressed down correspondingly and opened by the springs 11 of the pressure adjustment unit 8. The corresponding spring force which acts through the pretensioned springs 11 by means of the spring holder 22 on the spring plate 10 or on the fastening means 12 holds the pressure-reducing valve 31 opened. The strength of the pretensioning of the springs 11 is reached via the spindle 9 by means of which the springs 11 can be tensioned together to a desired length, which produces the corresponding pretensioning force or spring force. There is also the possibility of providing only one spring 11 in the valve 31 which reduces the spring force whereby the adjustable output pressure lies in a lower region than when two springs 11 are installed and thereby have a higher spring force and thus permit a higher output pressure. Through this arrangement possibility for the springs 11 a wide tension width of the adjustable output pressure is possible without changing the structural size of the valve.

Figure 2:
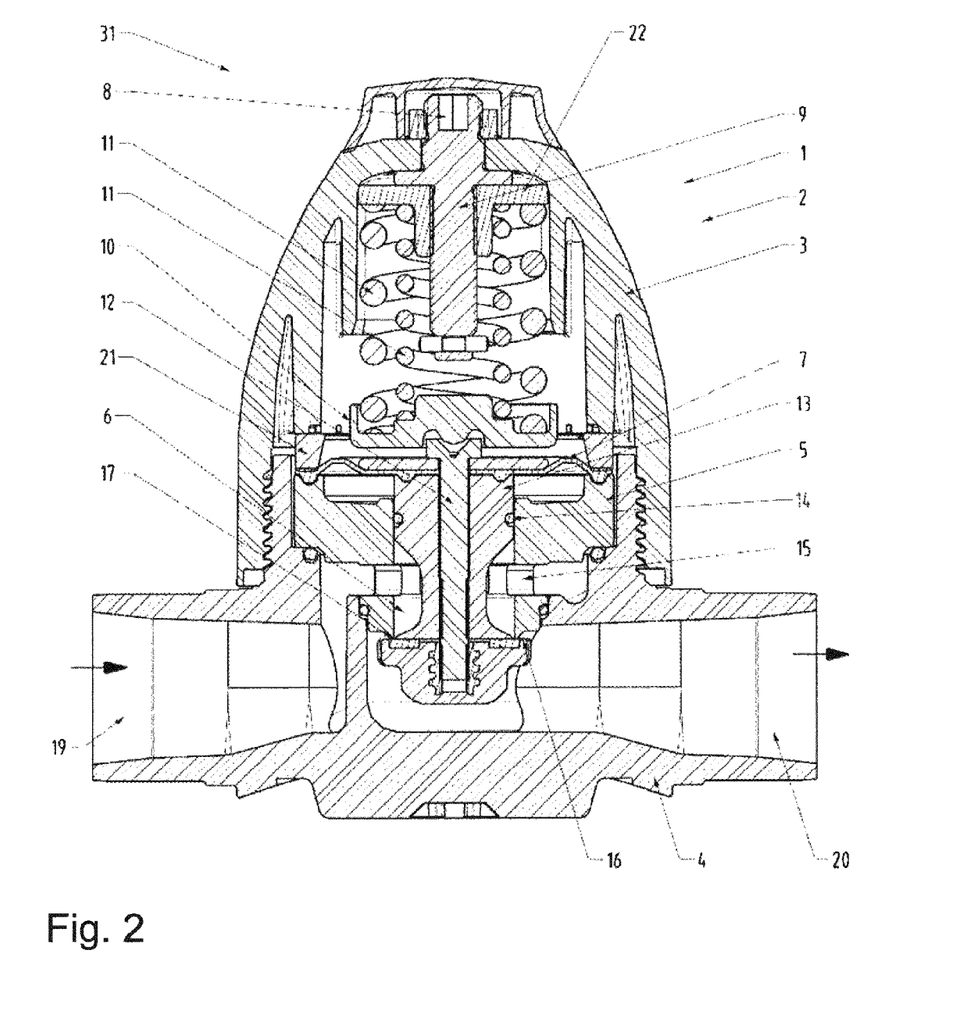

FIG. 2 shows the pressure-reducing valve 31 in the closed position. The output pressure thus lies above the pre-set output pressure. The medium flows via the bypass bores 18 which are disposed in the interior housing 5 through into the space underneath the diaphragm 7. The pressure which arises there presses against the spring force. As soon as the force through the medium underneath the diaphragm 7 is higher than the permissible output pressure or the set spring force, the springs 11 are further compressed and the poppet 13 is drawn upwards in the poppet bore 6 by the diaphragm 7. The sealing element 14 disposed on the poppet 13 seals off the poppet bore 6. The sealing element 14 is pressure-assisted by the medium flowing in through the through-flow openings 15. The valve seat 17 is closed by the raised poppet 13 since the sealing surface 16 of the poppet 13 or poppet tip 23 seals off the valve seat 17. If the output pressure drops below the pre-set value, then the pressure also drops underneath the diaphragm 7. The poppet 13 sinks correspondingly and the medium can flow through the valve 31 again.

The valve 1, 31, 41 is characterised in that the cartridge 30, 40 is pre-fitted and the cartridges 30, 40 are designed so that cartridges 30, 40 with different functions fit in the same housing 2 whereby the housing 2 is compatible for all corresponding cartridges 30, 40 of their corresponding structural size.

Figure 3:
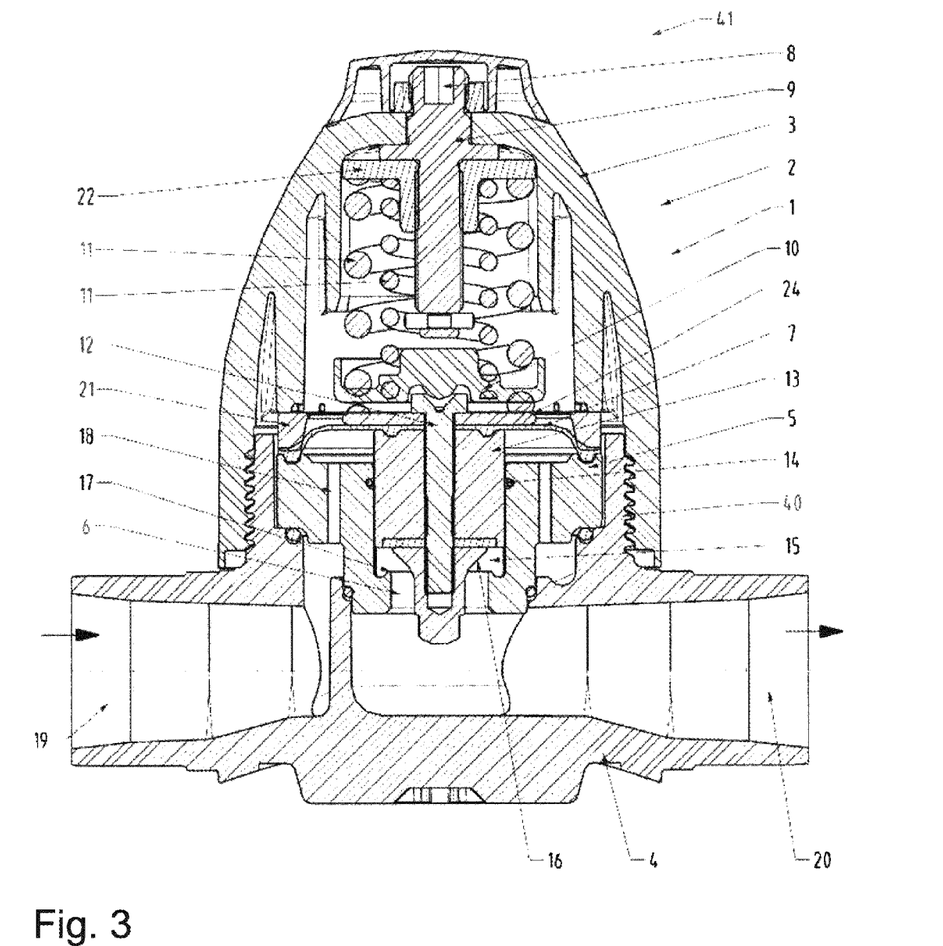

FIG. 3 shows a valve 1 according to the invention which serves through the installed cartridge 40 as a pressure-retaining valve 41. Obviously further types of valve are also conceivable which have a further function. The condition is only that the cartridge can be installed in the housing 2 and the function of the valve 1 is determined by the cartridge. Also with the pressure-retaining valve 41 the adjustment of the permissible pressure likewise via the pressure adjustment unit 8 behaves analogously with the pressure-reducing valve 31 since also here the same pressure adjustment unit 8 can be used.

The pressure-retaining valve 41 in FIG. 3 regulates the pressure in the supply pipe. This means, that if the pressure in the supply pipe rises or the pressure in the case of the medium flowing through the inlet pipe 19 rises so that it exceeds the permissible pre-set pressure, the medium flows with too high a pressure through the bypass bore 18 and strikes the diaphragm 7 which raises up the poppet 13 and thus opens the valve seat 17 and the medium can flow away through the through-flow opening 15 and the pressure in the supply pipe drops again. With too low a pressure in the supply pipe the pressure-retaining valve 41 acts in the reverse way whereby the poppet 13 sinks and the valve seat 17 is thereby closed, no medium flows away and the pressure in the supply pipe rises again.

As already mentioned, the present invention is characterised in that a valve 1 can be formed which has a universally usable housing 2 in which a cartridge 30, 40 can be inserted which is designed as a function unit or defines the function of the valve 1 and is individually exchangeable as well as also the pressure adjustment unit is advantageously universally usable and with a function change of the valve 1 can also be used again. The cartridge 30, 40 is pre-fitted, that is, that the cartridge 30, 40 consists of individual component parts, such as by way of example for the examples given here of the pressure-reducing and pressure-retaining valve 31 41, a poppet 13, a fastening means 12, a diaphragm 7, a disc 24, and an interior housing 5 as well as a poppet tip 23 on which the sealing surface 16 is disposed, but obviously a one-piece poppet is also conceivable which has no separate component part of a poppet tip and on which the sealing surface is directly disposed. However other component parts are also conceivable for constructing a cartridge, which component parts can be installed in the housing 2 and define the function of the valve 1.

Figure 4:
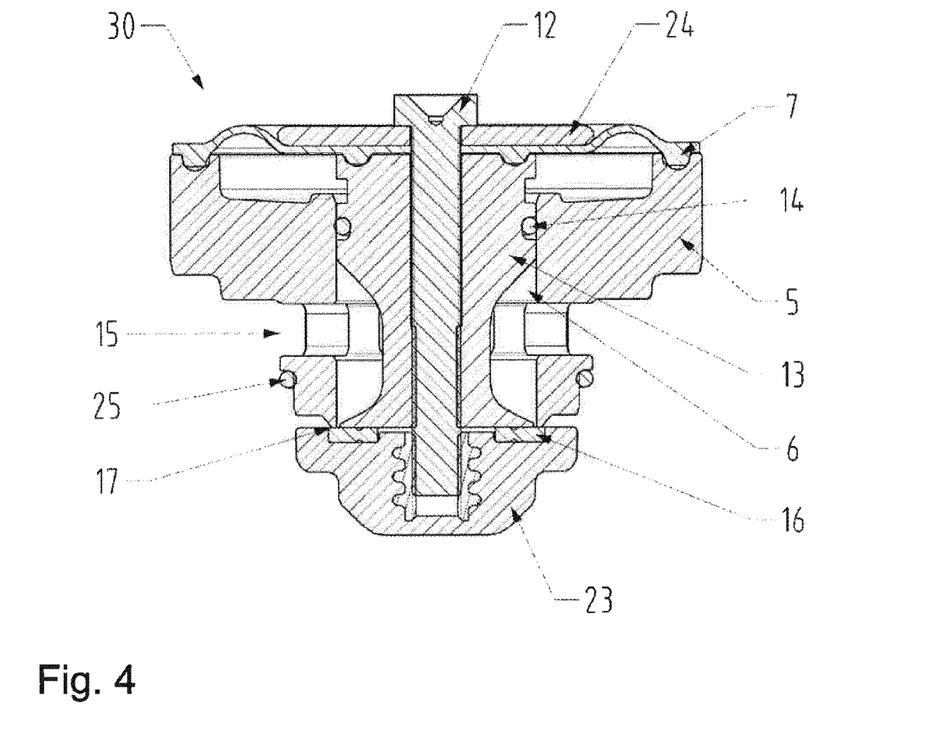
Figure 5:
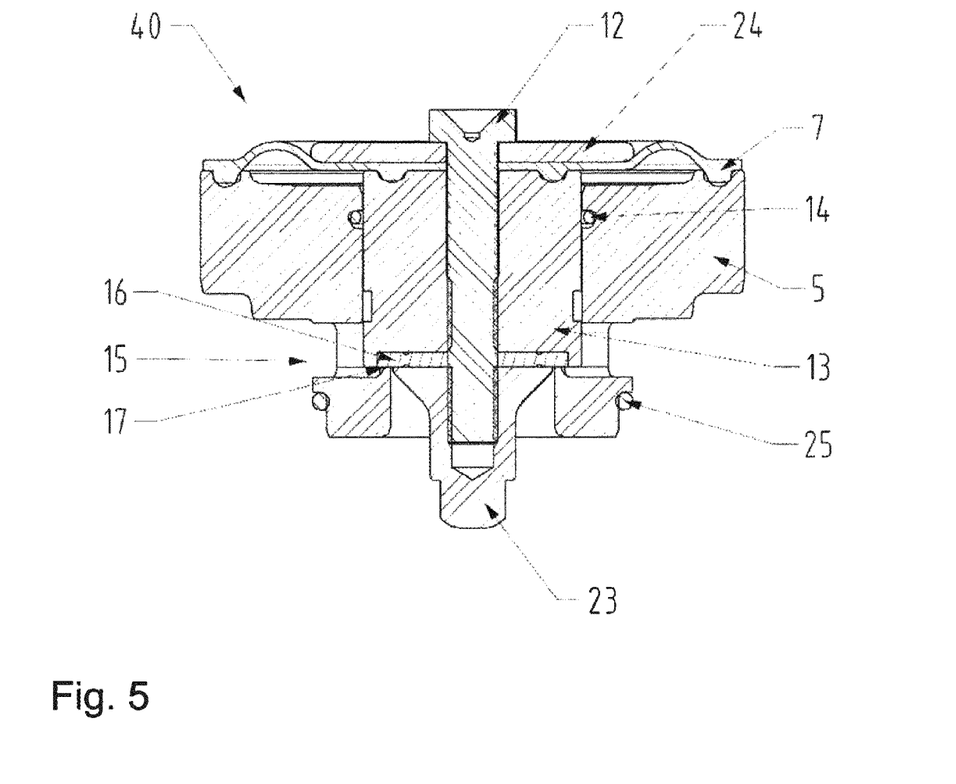

FIG. 4 shows the cartridge 30 which can be installed in a valve housing 2 in order to obtain a pressure-reducing valve 31. Apart from determining the function of the valve 1 the cartridge 30, 40 also undertakes the sealing function. This means that the sealing elements which serve for sealing the valve 1 are disposed in or on the cartridge 30, 40. The pressure-reducing valve like the pressure-retaining valve 31, 41 has a sealing element 14 in the poppet 13 or in the poppet bore 6. The valve seat 17 is likewise disposed in the cartridge 30, 40, that is, not directly on the housing lower part 4 as known mostly from the prior art. The valve seat 17 is disposed on the interior housing 5 and with the sealing surface 16, which is disposed in these embodiments on the poppet tip 23, wherein in the case of a one-piece poppet an arrangement directly on the poppet would be conceivable, undertakes the opening and closing function of the valve 1, whereby the cartridge 30, 40 forms the function unit, which is apparent from FIGS. 4 and 5. The cartridge 30 in FIG. 4 shows a cartridge 30 of a pressure-reducing valve 31 and the cartridge 40 illustrated in FIG. 5 shows a cartridge 40 of a pressure-retaining valve 41.

LIST OF REFERENCE NUMERALS

1 Valve
2 Housing
3 Housing upper part
4 Housing lower part
5 Interior housing
6 Poppet bore
7 Diaphragm
8 Pressure adjustment unit
9 Spindle
10 Spring plate
11 Spring
12 Fastening means
13 Poppet
14 Sealing element
15 Through-flow opening
16 Sealing surface
17 Valve seat/sealing edge
18 Bypass bore
19 Inlet pipe
20 Outlet pipe
21 Retaining ring
22 Spring holder
23 Poppet tip
24 Disc
25 Sealing element
30 Cartridge for reducing pressure
31 Pressure-reducing valve
40 Cartridge for maintaining pressure
41 Pressure-retaining valve

The invention claimed is:

1. A universal valve apparatus for either reducing or maintaining pressure of medium flowing through a pipeline, said apparatus comprising:

a common housing having an upper part and a lower part removably coupled together, at least one of the parts defining an interior chamber, the housing further including a pressure adjustment mechanism having a spindle, a spring plate, a spring holder and a spring surrounding the spindle and extending from the spring holder to the spring plate;

a pressure reducing cartridge configured to reduce pressure of the medium flowing through the pipeline, the pressure reducing cartridge having an upper part and a lower part, the upper part having a housing with an upper portion, a poppet and a diaphragm surrounding the poppet, the diaphragm being located on an upper surface of the housing, the lower part having a valve seat and a sealing surface;

a pressure maintaining cartridge configured to maintain pressure of the medium flowing through the pipeline, the pressure maintaining cartridge having an upper part and a lower part, the upper part including a housing with an upper portion, a poppet and a diaphragm surrounding the poppet, the diaphragm being located on an upper surface of the housing, the lower part having a valve seat and a sealing surface;

wherein either the pressure reducing cartridge or the pressure maintaining cartridge is inserted into the common housing by removing the upper and lower part of the common housing and then inserting one of the cartridges into the interior chamber of the common housing and thereafter recoupling the upper and lower parts together, and the pressure reducing cartridge and pressure maintaining cartridge both having essentially the same upper parts so that both cartridges can be used in the same housing, while the pressure reducing cartridge having a lower part configured to reduce pressure of the medium flowing through the pipeline, with the pressure maintaining cartridge having a lower part configured to maintain the pressure of the medium flowing through the pipeline; the lower parts of the pressure reducing and pressure maintaining cartridges being different.

2. The valve according to claim 1 wherein the housing accepts either cartridge without any further machining or mechanical working on the housing.

3. The valve according to claim 1 wherein the valve seat is disposed on an interior housing of the cartridge.

4. The valve according to claim 1 wherein the sealing surface is disposed on the poppet or at the poppet tip and with the valve seat regulates passages through the valve.

5. The valve according to claim 1 wherein each cartridge has a disc.

6. A universal valve apparatus for either reducing or maintaining pressure of medium flowing through a pipeline, said apparatus comprising:

a common housing having an upper part and a lower part removably coupled together, at least one of the parts defining an interior chamber, the housing further including a pressure adjustment mechanism having a spindle, a spring plate, a spring holder and a spring surrounding the spindle and extending from the spring holder to the spring plate, the common housing further providing an abutment surface surrounding the spindle;

a pressure reducing cartridge configured to reduce pressure of the medium flowing through the pipeline, the pressure reducing cartridge having a housing with an upper portion, a poppet and a diaphragm surrounding the poppet, the diaphragm being located on an upper surface of the housing and being configured to be clamped between the abutment surface of the common housing and the upper portion of the pressure reducing cartridge housing;

a pressure maintaining cartridge configured to maintain pressure of the medium flowing through the pipeline, the pressure maintaining cartridge having a housing with an upper portion, a poppet and a diaphragm surrounding the poppet, the diaphragm being located on an upper surface of the housing and being configured to be clamped between the abutment surface of the common housing and the upper portion of the pressure maintaining cartridge housing;

wherein either the pressure reducing cartridge or the pressure maintaining cartridge is inserted into the common housing by removing the upper and lower part of the common housing and then inserting one of the cartridges into the interior chamber of the common housing and thereafter recoupling the upper and lower parts together such that the diaphragm of the inserted cartridge is clamped between the abutment surface of the common housing and the upper portion of the inserted cartridge housing.

* * * * *